US007294373B2

(12) United States Patent
Tsuboi et al.

(10) Patent No.: US 7,294,373 B2
(45) Date of Patent: Nov. 13, 2007

(54) LIQUID CRYSTAL DISPLAY CELL, DISPLAY CELL, GLASS SUBSTRATE FOR DISPLAY DEVICE AND MANUFACTURING METHOD FOR LIQUID CRYSTAL DISPLAY CELL

(75) Inventors: Kenji Tsuboi, Omihachiman (JP); Hideo Ohkuma, Yasu-cho (JP); Tomohito Johnai, Moriyama (JP)

(73) Assignees: International Business Machines Corporation, Armonk, NY (US); CMO Japan Co., Ltd., Tokyo (JP)

( * ) Notice: Subject to any disclaimer, the term of this patent is extended or adjusted under 35 U.S.C. 154(b) by 322 days.

(21) Appl. No.: 10/864,889

(22) Filed: Jun. 8, 2004

(65) Prior Publication Data

US 2005/0007540 A1     Jan. 13, 2005

(30) Foreign Application Priority Data

Jun. 11, 2003   (JP)   .............................. 2003-166007

(51) Int. Cl.
  *G02F 1/133* (2006.01)
(52) U.S. Cl. .................... 428/1.51; 428/1.52; 428/1.62; 349/122; 349/158; 65/60.5; 65/60.8
(58) Field of Classification Search ................. 428/1.5, 428/1.51–1.52, 1.62; 349/158, 122; 65/60.1, 65/60.3, 60.5, 60.8, 60.51
See application file for complete search history.

(56) References Cited

U.S. PATENT DOCUMENTS

| | | | | |
|---|---|---|---|---|
| 4,654,435 A | * | 3/1987 | Kitahara et al. | ............... 560/61 |
| 5,304,323 A | * | 4/1994 | Arai et al. | ............... 252/299.5 |
| 5,415,927 A | * | 5/1995 | Hirayama et al. | ....... 428/307.3 |
| 5,510,147 A | * | 4/1996 | Volpe | ....................... 427/397.7 |
| 5,516,388 A | * | 5/1996 | Moran et al. | ............. 156/89.14 |
| 5,843,200 A | * | 12/1998 | Richards | ....................... 65/102 |
| 5,858,819 A | * | 1/1999 | Miyasaka | .................... 438/149 |
| 5,991,493 A | * | 11/1999 | Dawes et al. | ................ 385/141 |
| 6,327,011 B2 | * | 12/2001 | Kim | ............................ 349/122 |
| 6,415,093 B1 | * | 7/2002 | Nakamura et al. | .......... 385/141 |
| 6,743,517 B2 | * | 6/2004 | Nakamura et al. | .......... 428/447 |

FOREIGN PATENT DOCUMENTS

| | | |
|---|---|---|
| JP | 05-061011 | 3/1993 |
| JP | 2001-013489 | 1/2001 |

OTHER PUBLICATIONS

Merriam-Webster's Collegiate Dictionary, 10th edition, 1999.*
Patent Abstracts of Japan for JP2001-013489 published on Jan. 19, 2001.
Patent Abstracts of Japan for JP05-061011 published on Mar. 12, 1993.

* cited by examiner

*Primary Examiner*—Rena Dye
*Assistant Examiner*—Sow-Fun Hon
(74) *Attorney, Agent, or Firm*—Darby & Darby

(57) ABSTRACT

A liquid crystal display device includes a liquid crystal display cell including lamination of a lower polarizer, a first glass substrate having a metal oxide glass film formed on the side of the lower polarizer, a liquid crystal layer, a second glass substrate having a metal oxide glass film formed on the side opposite the liquid crystal layer, and an upper polarizer; and a backlight unit including a light guide plate, a diffusion plate, and light sources. The metal oxide glass films are a transparent film made of an organic/inorganic hybrid material. The films are formed by coating a solution of a metal alkoxide composition on individual outer surfaces of the first glass substrate and the second glass substrate, both of which have been roughened by a polishing process, and by hydrolyzing and curing the metal alkoxide composition.

19 Claims, 3 Drawing Sheets

LIQUID CRYSTAL DISPLAY CELL, DISPLAY CELL, GLASS SUBSTRATE FOR DISPLAY DEVICE AND MANUFACTURING METHOD FOR LIQUID CRYSTAL DISPLAY CELL

INCORPORATION BY REFERENCE

The present application claims priority under 35 U.S.C. §119 to Japanese Patent Application No. 2003-166007 filed on Jun. 11, 2003. The content of the application is incorporated herein by reference in its entirety.

FIELD OF THE INVENTION

The present invention relates to a liquid crystal display cell and the like, and more particularly to a light-weighted liquid crystal display cell and the like.

BACKGROUND OF THE INVENTION

Recently, there has been a great need for compact and light liquid crystal display devices. A light-weight liquid crystal display device can be provided, for example, by thinning a glass substrate used for a liquid crystal display (e. g., see Japanese Patent Laid-Open Publication No. 2001-013489, Japanese Patent Laid-Open Publication No. HEI-05-061011).

The above inventions have been conceived to make a glass substrate lighter and thinner by mechanically polishing the surface of the glass substrate. A thin glass substrate has degraded strength and is difficult to handle. Therefore, typically, two sheets of glass substrates with a thickness that ensures reliable strength are bonded to each other by a sealant after patterning the transparent electrodes. The terminals are sealed to prevent contamination, for example, by polishing agents. Subsequently, the surfaces of the glass substrates are mechanically polished or etched by, for example, lapping, grinding or blasting. Then, those substrates are cut into cells of specific sizes.

As described above, the thickness of the glass substrates polished is reduced, for example, from 0.7 mm to about 0.4 mm. And for a 14-inch display, the weight of the display could be reduced by about 100 grams. Provided on the reduced glass substrates are switching devices, pixel electrodes, opposing electrodes, or the like, to form a liquid crystal display cell.

However, these mechanical polishing or etching methods reported in the Japanese references above require that a pair of glass substrates bonded to each other be fixed to a dedicated fixture and a two-step polishing operation be performed, i. e., a rough polishing step is performed as a first stage and then a finishing polishing step is performed as a second stage. However, the surface roughness of the glass substrates is increased in the first stage (creation of rough surface) and the light transmittance of the glass substrates is reduced to not greater than 20% from 100%. To restore the light transmittance of the glass substrates, the finishing polishing step is performed on the surfaces of the glass substrates, whose surface roughness is first increased by the rough polishing method. If the finishing polishing step involves the grinding or blasting, a grinding stone is used to polish the surfaces. Thus, flattening the surfaces of the glass substrates (mirror surfaces) leads to restoring the reduced light transmittance of the glass substrates.

However, because the reduced glass substrates have its strength reduced, the glass substrates may break more easily during the finishing polishing step. Accordingly, the thickness of the glass substrates is subject to some restriction to ensure the strength of the substrates. For example, a problem arises when the substrate is reduced to a thickness not greater than 0.3 mm.

Furthermore, the polishing operation causes micro-cracks to appear on the surfaces of the glass substrates, potentially reducing the physical strength. Reduction in the physical strength of the glass substrates becomes more pronounced as the thickness of the glass substrates is reduced. Further, bending, deflection, deformation caused by changes in temperature, and the like have to be taken into account, and therefore, the productivity of liquid crystal display device may suffer because of the reduced thickness.

SUMMARY OF THE INVENTION

The present invention is provided to solve the problems highlighted when reducing the weight of a liquid crystal display device.

That is, an object of the invention is to restore the light transmittance of a glass substrate whose surface roughness is increased by a polishing operation and to provide a liquid crystal display cell employing such a glass substrate.

Furthermore, another object of the invention is to enhance the strength of a glass substrate whose thickness is reduced by a polishing operation and to provide a liquid crystal display cell employing a glass substrate whose strength is enhanced.

Moreover, still another object of the invention is to provide a light-weighted glass substrate for use in a liquid crystal display cell and a light-weighted glass substrate for use in a display device.

Additionally, still another object of the invention is to provide a method for manufacturing a liquid crystal display cell.

An embodiment of the invention provides a configuration in which the polished surface of a glass substrate is coated with a transparent material having a refractive index substantially equivalent to a refractive index of the glass substrate. That is, a liquid crystal display cell includes a pair of glass substrates separated by a prescribed gap and having electrodes formed on inner substrate surfaces opposing each other, the gap being filled with a liquid crystal; and a metal oxide glass film covering an outer surface of the glass substrate and having a refractive index equivalent to a refractive index of the glass substrate.

The outer surface of the glass substrate for use in the liquid crystal display cell can be roughened by a physical or chemical technique. Examples of the physical technique include polishing, sandblasting, grinding, etc. Examples of the chemical technique include chemical etching using hydrofluoric acid, etc.

A difference between the refractive index of the glass substrate and the refractive index of the metal oxide glass film can be within plus/minus 0.02. A combination of the glass substrate and metal oxide glass film covering the outer surface of the glass substrate exhibits high transmittance of light.

The metal oxide glass film covering the outer surface of the glass substrate can be formed by hydrolyzing a metal alkoxide composition coated on the outer surface of the glass substrate. A glass-like film is formed on the surface of the glass substrate, on which surface a number of projections and depressions are formed by a physical or chemical technique. The surface is then flattened, which eliminates scattering of light at an interface between the glass substrate and metal oxide glass film and restores the glass substrate to have approximately a 100% light transmittance.

The metal alkoxide composition used to form the metal oxide glass film preferably contains: (a) organic polysiloxane having methyl group or phenyl group; (b) organic polysiloxane having hydroxyl group or hydrolyzable functional group; and (c) a curing agent. A solution of such metal alkoxide composition is coated on the outer surface of the glass substrate and dehydrated/condensed by hydrolyzing metal alkoxide at a relatively low temperature to form a transparent film that cross-links in three dimensions.

A liquid crystal display cell according to another embodiment of the invention includes a pair of glass substrates facing each other and a liquid crystal enclosed between the pair of glass substrates, where the glass substrates each include a first layer having a rough surface with a surface roughness of not greater than 0.5 μm and a second layer adhesively bonded to the first layer and having a mirror surface with a surface roughness of not greater than 0.05 μm. That is, although the first layer of a two-layered structure constituting the glass substrate is formed to have a rough surface with a reduced light transmittance, the second layer made of a transparent material is adhesively bonded to an upper surface of the first layer to flatten the rough surface of the first layer.

Furthermore, a display cell according to another embodiment of the invention includes a glass substrate having a thickness reduced by a thinning process, and a sol-gel layer having organic polysiloxane as a primary constituent and formed on a surface of the thinned glass substrate, the thinned substrate being produced by the thinning process. The sol-gel layer of the display cell both reduces the weight of the display cell and compensates for the reduced physical strength of the glass substrate. Moreover, in the thinning process, the surface of the glass substrate roughened by rough polishing can be flattened without the finishing processing such as polishing, thereby simplifying the manufacturing steps.

To form a sol-gel layer on the surface of the thinned glass substrate, the hydrolyzation of organic polysiloxane is preferably provided at a temperature of not greater than 80 degrees C. Even when a liquid crystal is enclosed between the glass substrates, the hydrolyzation provided at such a relatively low temperature prevents the liquid crystal enclosed between the substrates from being thermally changed and thereby reducing the weight of the display cell. Moreover, the curing agent used in the hydrolyzation is preferably chosen from an organic tin compound or boron halide.

Subsequently, a glass substrate for a display device according to an embodiment of the invention includes an inorganic glass layer having a rough surface formed by a thinning process; and a coating layer obtained by hydrolyzing a metal alkoxide composition adhesively covering the rough surface of the glass substrate.

Additionally, a method for manufacturing a liquid crystal display cell according to an embodiment of the invention includes a bonding step of forming display electrodes on a first glass substrate and then bonding together the first glass substrate and a second glass substrate to allow the two substrates to have a prescribed gap between the substrates; a confining step of confining a liquid crystal to the prescribed gap between the first glass substrate and second glass substrate adhesively bonded together in the bonding step; a thinning processing step of reducing a thickness of the first glass substrate and/or the second glass substrate, the substrates having the liquid crystal enclosed between the substrates; a sol-gel layer formation step of forming a sol-gel layer containing a metal alkoxide composition as a primary constituent on outer surfaces of the first glass substrate and/or the second glass substrate, the substrates having the thickness reduced in the thinning processing step.

DETAILED DESCRIPTION OF THE PREFERRED EMBODIMENTS

Embodiments of the invention will be explained in detail below.

First Embodiment

Figure 1:
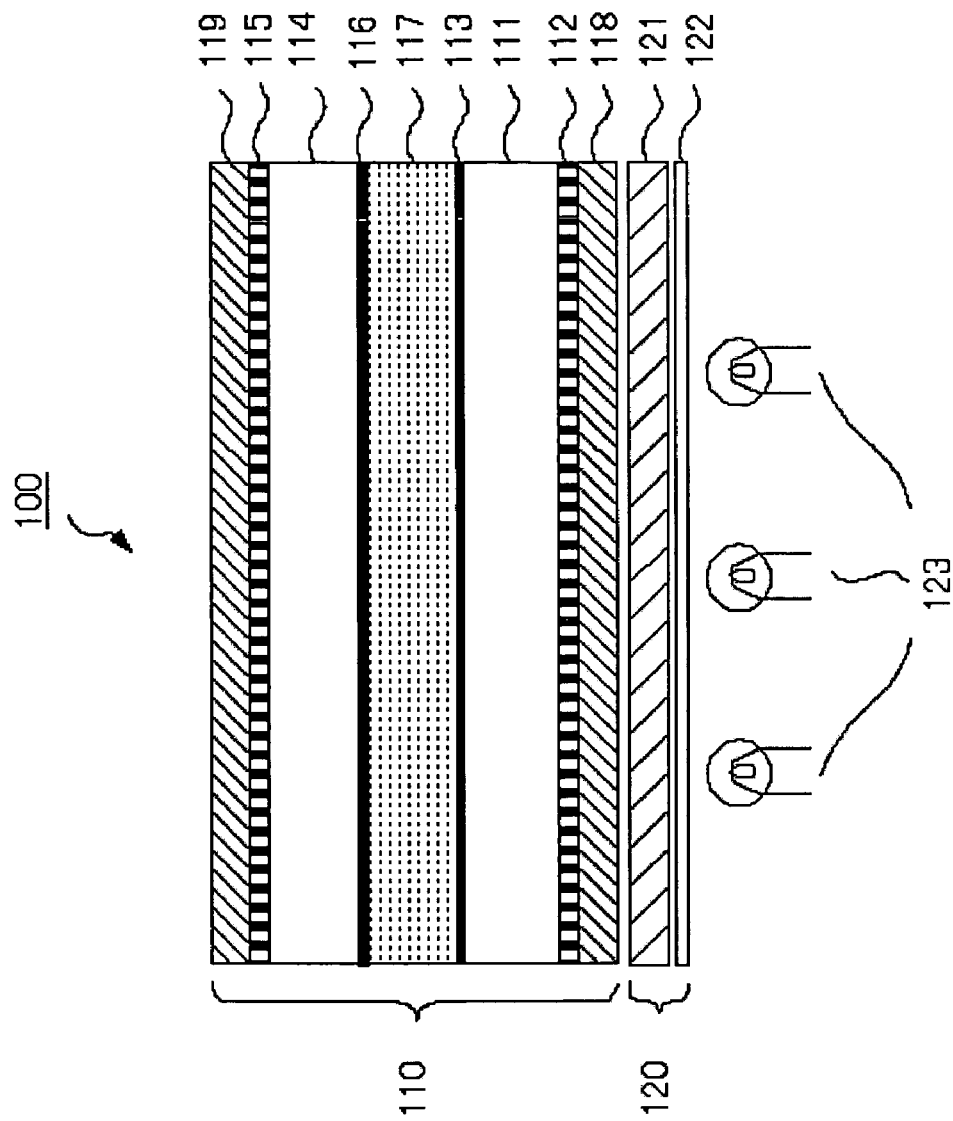
FIG. 1 is a diagram of a liquid crystal display cell according to an embodiment of the invention.

FIG. 1 is a diagram of a liquid crystal display cell according to an embodidment of the invention. A liquid crystal display device 100 shown in FIG. 1 includes: a liquid crystal display cell 110 including a lamination of a lower polarizer 118, a first glass substrate 111 having a metal oxide glass film 112 formed on the side of the lower polarizer 118, a liquid crystal layer 117, a second glass substrate 114 having a metal oxide glass film 115 formed on the side opposite the liquid crystal layer 117, and an upper polarizer 119; and a backlight unit 120 including a light guide plate 121, a diffusion plate 122, and light sources 123. The liquid crystal layer 117 is configured so that peripheral portions of the first glass substrate 111 and second glass substrate 114 are sealed with a sealant (not shown) and the layer includes a liquid crystal filled in a space formed by a prescribed gap. Though not shown, a plurality of optical compensation films designed to enhance scattering or increase brightness may also be provided outside the lower polarizer 118.

In a display area of the liquid crystal display cell 110, transparent electrodes 113, 116 are formed respectively on opposing internal surfaces of a pair of first glass substrate 111 and second glass substrate 114. The first glass substrate 111 is an array substrate having thin film transistors (TFTs) (not shown) serving as a switching device and provided on the upper surface thereof.

A glass used for the first glass substrate 111 or second glass substrate 114 is an inorganic layer that includes but not limited to soda lime glass, single plate glass, bent glass, reinforced glass, bonded glass, multi-layered glass, glass for mirror, etc. A glass having a refractive index of 1.48 to 1.52 is typically used. The thickness of the first glass substrate 111 or second glass substrate 114 is typically in a range of 0.5 mm to 1.0 mm but may also fall outside of this range. The thickness of the first glass substrate 111 or second glass substrate 114 may be different from each other or the same.

To mechanically polish and thin the first glass substrate 111 and second glass substrate 114, they can be polished using abrasive powder such as aluminum oxide, sand blastedusing micro-particles such as aluminum oxide together with air and water, or ground using a diamond blade.

Furthermore, surface roughness (Ra) of outer surfaces roughened by the mechanical polishing process can be optionally performed. However, the roughness is determined in terms of appropriate polishing rate, and a surface roughness of not greater than 1 μm is typically formed. The surface roughness (Ra) may be typically not greater than 0.5 μm and preferably not greater than 0.2 μm. Further, the surface roughness (Ra) may be typically not less than 0.05 μm and preferably not less than 0.1 μm. When polishing using 1000 grit abrasive powder, the surface roughness (Ra) is about 0.3 μm. when blasting using 320 grit abrasive powder, the surface roughness (Ra) is about 3 μm. And when grinding using 600 grit abrasive powder, the surface roughness (Ra) is about 0.2 μm. The first glass substrate 111 and second glass substrate 114 are thinned by these processes, and the thickness of the original glass substrates is reduced by at least 20%.

The metal oxide glass films 112, 115 formed on the outer surfaces of the first glass substrate 111 and second glass substrate 114 are a light transparent film made of an organic/inorganic hybrid material. In the metal oxide glass films 112, 115, three-dimensional cross-linkages are formed by a sol-gel hydrolytic reaction of a metal alkoxide composition. An example of a metal alkoxide composition includes a curable composition containing organic polysiloxane as a primary constituent. Examples of a constituent of a curable composition containing primarily organic polysiloxane include: (a) organic polysiloxane with methyl group or phenyl group; (b) organic siloxane with hydroxyl group or hydrolyzable functional group; and (c) a curing agent.

(a) Examples of organic polysiloxane with methyl group or phenyl group include liquid organic polysiloxane with methyl group or phenyl group and alkoxy group having a carbon number of 1 to 4. Examples of alkoxy group having a carbon number of 1 to 4 include methoxy group, ethoxy group, propoxy group, and butoxy group.

(b) Examples of hydrolyzable group of organic siloxane with hydroxyl group or hydrolyzable functional group include alkoxy group, acyloxy group, ketoxime group, amido group, alkenyloxy group, and halogen atom. Furthermore, organic siloxane containing the constituent (b) contains monovalent organic group or hydrogen atomic in some cases, and examples of monovalent organic group include: alkyl group such as methyl, ethyl, propyl, butyl, hexyl; alkenyl group such as vinyl, allyl; aryl group such as phenyl, tolyl, xylyl; aralkyl group such as phenethyl, β-phenylpropyl; aminoalkyl group such as N-(β-aminoethyl)-γ-aminopropyl; group, containing epoxy group, such as γ-glycidoxypropyl, 3,4-epoxycyclohexyl; group, containing (metha) acrylic group, such as γ-methacryloxypropyl; mercaptoalkyl group such as γ-mercaptopropyl; cyanoalkyl group such as cyanoethyl; chloroalkyl group such as β-chloroethyl, γ-chloroethyl; fluoroalkyl group such as 3,3,3-trifluoropropyl. In the constituent (b) a partially hydrolyzed substance (liquid siliconeresin) may be contained in some cases.

As the curing agent (c), a curing catalyst used in a condensation-curing silicone composition is typically used. Examples of a curing agent include: an organic amine such as triethanolamine; carboxylic acid metal salts such as octyl acid tin and octyl acid zinc; organic tin compounds such as dibutyltindilaurate and dibutyltindioctoate; titanic acid esters such as tetrabutyltitanate and tetrapropyltitanate; a quaternary ammonium compound such as quaternary ammonium carboxylate; amine silane coupling agents such as γ-aminopropyltrietoxysilane and N-(β-aminoethyl)-γ-aminopropyltrimetoxysilane. Furthermore, an organic aluminum compound or boron halide can be used. Among those, an organic tin compound or boron halide is preferable. Two or more of those curing agents can be used together.

A metal alkoxide composition used to form the metal oxide glass films 112, 115 is typically used after the composition is prepared in the form of a diluted solution with a suitable solvent. A solvent used in preparing the solution is not particularly limited to a particular solvent as long as it is capable of dissolving and/or dispersing the constituent (a), constituent (b) and constituent (c), and includes, for example: alcohols such as methanol, ethanol, isopropanol; ether alcohol and ethers such as ethylene glycol monomethyl ether, ethylene glycol monoethyl ether, tetrahydrofuran, dioxane; ketones such as acetone, methyl ethyl ketone, diethyl ketone; esters such as methyl acetate, ethyl acetate, n-butyl acetate; aliphatic hydrocarbon such as n-hexane, gasoline, rubber solvent, mineral spirit, kerosene.

The sol-gel layer constituting the metal oxide glass films 112, 115 is formed in the following manner. A solution of the above-described metal alkoxide composition is coated on the rough surface of the first glass substrate 111 and second glass substrate 114, both of which have been thinned by a thinning process, to achieve a suitable thickness (typically, not greater than 10 μm) and after coating, hydrolyzed at a temperature of not greater than 80 degrees C for a few minutes to a few hours to cure the metal alkoxide composition. A method for coating a solution of metal alkoxide composition includes, for example, brush coating, spray coating, roller coating, and spin coating. The metal oxide glass films 112, 115 made of thus-formed sol-gel layer containing organic polysiloxane as a primary constituent have a hardness of, for example, about 9 HB and serve as a transparent coating layer which is adhesively bonded to the rough surface of an inorganic glass layer making up the first glass substrate 111 and second glass substrate 114.

Figure 2:
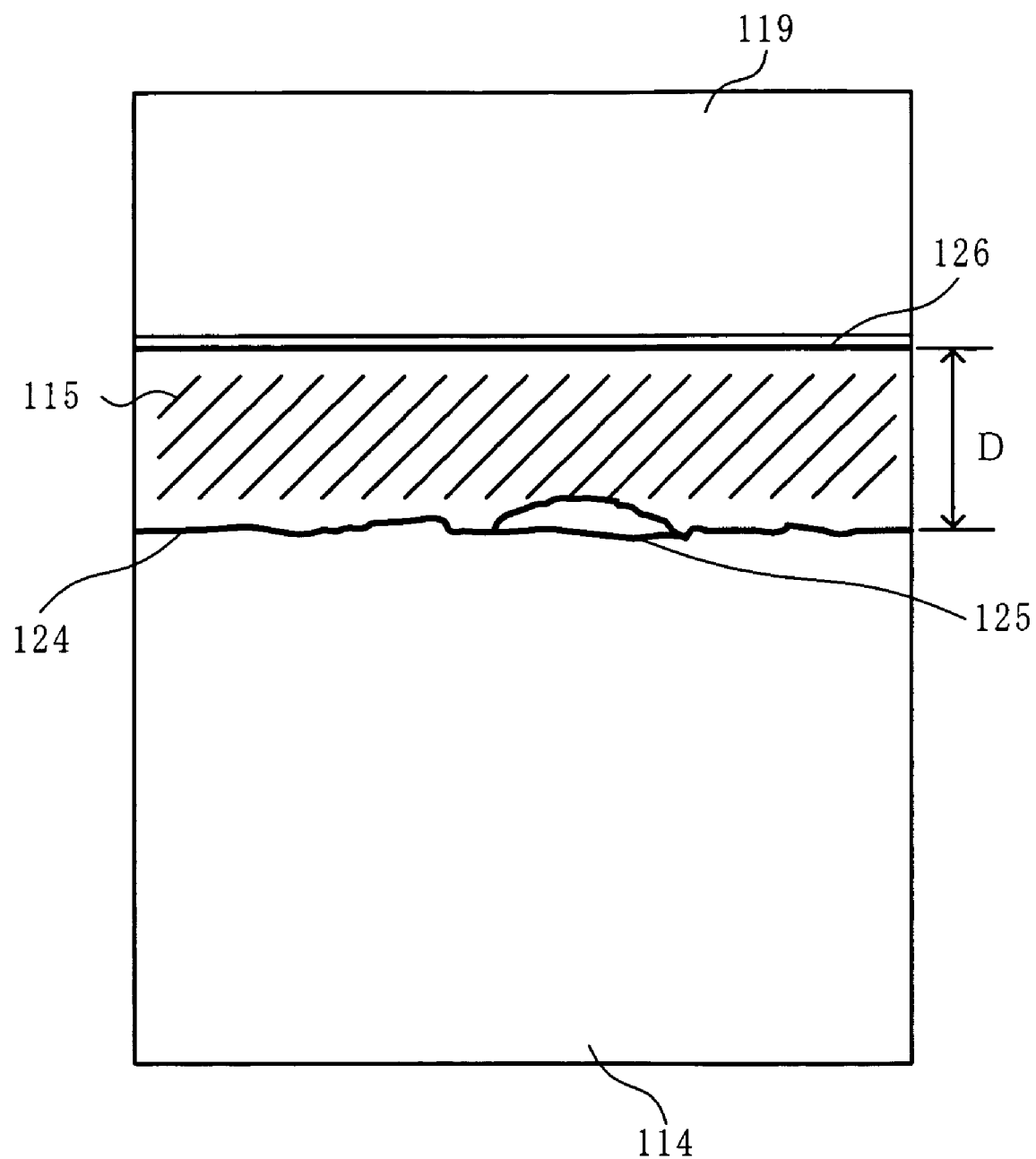
FIG. 2 is an enlarged cross sectional view of a sol-gel layer adhesively bonded to the rough surface of an inorganic glass layer according to an embodiment of the invention.

FIG. 2 is an enlarged cross sectional view of the sol-gel layer adhesively bonded to the rough surface of the inorganic glass layer. In FIG. 2, the same signs are attached to the same components as those of FIG. 1. As shown in FIG. 2, the second glass substrate 114 thinned by mechanical polishing processing, a rough surface 124 roughened by the thinning process to a suitable roughness (Ra), the metal oxide glass film 115 made of the sol-gel layer covering and adhesively bonded to the rough surface 124 of the second glass substrate 114, and the upper polarizer 119 provided on a mirror surface 126 of the metal oxide glass film 115 are laminated. Though not shown, the first glass substrate 111 and the metal oxide glass film 112 formed to adhesively bond to the rough surface of the first glass substrate 111 have the configurations similar to those described above.

As previously described, because the outer surface of the second glass substrate 114 is mechanically polished, the rough surface 124 is formed to have a surface roughness (Ra) of not greater than 0.5 μm and fine cracks (micro-cracks 125) are present in projections on the surface. The solution of the metal alkoxide composition coated on the rough surface 124 to form the metal oxide glass film 115 has a suitable viscosity (e. g., 9 to 12 s/IHS) and is hydrolyzed at a relatively low temperature, i. e., at a temperature of not greater than 80 degrees C. A suitable period of time is required until the solution is cured. Accordingly, given a sufficient period of time for the solution of the metal alkoxide composition coated on the rough surface 124 to infiltrate into depressions on the rough surface 124 and to cure the coated composition, the fine cracks such as the micro-cracks 125 shown in FIG. 2 can be effectively filled with the solution. Thus, the rough surface 124 having projections and depressions is flattened by the glass-like metal oxide glass film 115, and as a result, it becomes possible to eliminate the scattering of light at an interface between the second glass substrate 114 and metal oxide glass film 115. Furthermore, the light transmittance can be restored to about 100% by forming the surface of the metal oxide glass film 115 into the mirror surface 126 with a surface roughness (Ra) of not greater than 0.05 µm. Moreover, such a glass-like film compensates for the reduced physical strength of the second glass substrate 114 and exhibits high stiffness, toughness, and excellent surface adhesion. That is, the film has excellent light transparency together with reinforcing and optical compensation properties.

A thickness (D) of the metal oxide glass film 112 (115) can be optionally selected depending on the magnitude of the surface roughness (Ra) of the outer surface of the first glass substrate 111 or the second glass substrate 114. The thickness is not limited to but is typically not greater than 10 µm. The thickness (D) is typically not less than 0.1 µm, and preferably not less than 1 µm. Furthermore, the thickness of the metal oxide glass films 112, 115 may be different from each other or may be the same.

Moreover, the metal oxide glass films 112, 115 have a refractive index equivalent to that of the first glass substrate 111 or second glass substrate 114. A difference between the refractive index of the first glass substrate 111 or the second glass substrate 114 and the refractive index of the metal oxide glass films 112, 115 is within plus/minus 0.02. Typically, the metal oxide glass films 112, 115 have a refractive index of 1.48 to 1.52. When the metal oxide glass films 112, 115 and the first glass substrate 111 or the econd glass substrate 114 have refractive indexes equivalent to each other, light transmitting through the first glass substrate 111 and the metal oxide glass film 112 (or the second glass substrate 114 and the metal oxide glass film 115) exhibits a behavior similar to that of light transmitting through a two-layered structure formed of two glass sheets overlaid one atop the other. A combination of the first glass substrate 111 and the metal oxide glass film 112 has high transparency, that is, the combination is able to allow 95% or more of light with a wavelength of 380 nm to 780 nm to pass through.

Second Embodiment

A second embodiment is applied to a liquid crystal display cell 110 of the liquid crystal display device 100. Instead of the metal oxide glass film 112 and the metal oxide glass film 115, coating layers made of transparent polymer with a refractive index equivalent to the refractive index of the first glass substrate 111 or the second glass substrate 114 can be provided on the outer surfaces of the first glass substrate 111 and the second glass substrate 114. This arrangement can also restore the light transmittance of the first glass substrate 111 or the second glass substrate 114. "Transparent polymer" refers to polymer having a light transmittance of typically not less than 70%, and preferably not less than 90%.

A thickness of the coating layer made of the transparent polymer and coated on the outer surface of the first glass substrate 111 or the second glass substrate 114 is optionally selected depending on the magnitude of the surface roughness (Ra) of the outer surface of the first glass substrate 111 or the second glass substrate 114. The thickness is not limited to but is typically not greater than 10 µm. The thickness (D) is typically not less than 0.1 µm, and preferably not less than 1 µm. The thickness of the coating layers made of transparent polymer may be different from each other or may be the same.

Examples of transparent polymers include thermoplastic resin, heat-curable resin, electron beam curable resin, ultraviolet curable resin, and so forth. The particular examples include acrylic resin, methacrylic resin, polycarbonate resin, polyolefin resin, polyester resin, polystyrene resin, epoxy resin, and so forth. For thermoplastic resin, heat-curable resin, and so forth, those resins are dissolved in an appropriate solvent to prepare a coating solution. The solution is coated on the surface of the first glass substrate 111 or the second glass substrate 114, on which the thinning process is performed. The coated surface is dried (heated) to form the transparent polymer. For ultraviolet curable resin, the resin itself or the resin dissolved in an appropriate solvent is prepared into a coating solution. The coating solution is coated on the surface of the first glass substrate 111 or second glass substrate 114, on which the thinning process is performed and irradiated with ultraviolet ray and cured to form the transparent polymer. Those materials may be used alone or in a mixture thereof. Furthermore, the materials may be used in a form of a multi-layered structure. Examples of the coating method include spin-coating, casting, and so forth.

Among the transparent polymers, ultraviolet curable resin is preferable in terms of high light-transmittance. Examples of the ultraviolet curable resin include radical ultraviolet curable resin and cationic ultraviolet curable resin, and any one of them can be used. The radical ultraviolet curable resin has a composition containing an ultraviolet curable compound and an optical polymerization initiator. The ultraviolet curable resin, may contain monofunctional (metha)acrylate and multifunctional (metha)acrylate as polymerized-monomer constituents. Those constituents may be used alone or in a mixture of two or more of those constituents. Acrylate and methacrylate are referred to generally as (metha)acrylate.

Examples of monofunctional (metha)acrylate include (metha)acrylate having a group including as substituent, such as, methyl; ethyl; propyl; butyl; amyl; 2-ethylhexyl; octyl; nonyl; dodecyl; hexadecyl; octadecyl; cyclohexyl; benzyl; methoxyethyl; butoxyethyl; phenoxyethyl; nonylphenoxyethyl; tetrahydrofurfuryl; glycidyl; 2-hydroxyethyl; 2-hydroxypropyl; 3-chloro-2-hydroxypropyl; dimethylaminoethyl; diethylaminoethyl; nonylphenoxyethyltetrahydrofurfuryl; caprolactone modified tetrahydrofurfuryl; isobornyl; dicyclopentanyl; dicyclopentenyl; and dicyclopentenyloxyethyl.

Examples of multifunctional (metha)acrylate include di(metha)acrylate from a glycol compound, such as 1,3-butylene glycol; 1,4-butanediol; 1,5-pentanediol; 3-methyl-1,5-pentanediol; 1,6-hexanediol; neopentyl glycol; 1,8-octanediol; 1,9-nonanediol; tricyclodecane dimethanol; ethylene glycol; polyethylene glycol; propylene glycol; dipropylene glycol; tripropylene glycol; and polypropylene glycol; and di(metha)acrylate from an isocyamulate compound, such as tris(2-hydroxyethyl)isocyamulate.

Typically, an optical polymerization initiator is dispersed in a radical ultraviolet curable resin. The optical polymerization initiator is preferably of the type that causes molecules to cleave or hydrogens to be drawn. Examples of an optical polymerization initiator that causes molecules to cleave include,: benzoin isobutyl ether; 2,4-diethylthioxanthone; 2-isopropylthioxanthone; benzyl; 2,4,6-trimethylbenzoyldiphenylphosphine oxide; 2-benzil-2-dimethylamino-1-

(4-morpholinophenyl)-butane-1-one; bis(2,6-dimethoxybenzoyl)-2,4,4-trimethylpentylphosphine oxide.

Moreover, the above materials for the initiator may be used together with compounds such as 1-hydroxycyclohexylphenylketone; benzoin ethyl ether; benzildimethylketal; 2-hydroxy-2-methyl-1-phenylpropane-1-one; 1-(4-isopropylphenyl)-2-hydroxy-2-methylpropane-1-one; and 2-methyl-1-(4-methylthiophenyl)-2-morpholinopropane-1-one. Examples of the optical polymerization initiator include, in case of the type causing hydrogen to be drawn: benzophenone; 4-phenylbenzophenone; isophthalphenone; 4-benzoyl-4'-methyldiphenylsulfide.

Additionally, a sensitizer may be used together with those optical polymerization initiators. Examples of the sensitizer include trimethylamine; methyldimethanolamine; triethanolamine; p-diethylaminoacetophenone; p-dimethylamino benzoic acid ethyl; p-dimethylamino benzoic acid isoamyl; N,N-dimethylbenzilamine; and 4,4'-bis(diethylamino)benzophenone.

Examples of the cationic ultraviolet curable resin include an epoxy resin containing an optical cationic polymerization initiator. Examples of the epoxy resin include: bisphenolA-epichlorhydrin type; alicyclic epoxy; long chain aliphatic type; brominated epoxy resin; glycidyl ester type; glycidyl ether type; heterocyclic compound. For the epoxy resin, a small amount of released chlorine and chlorine ion is preferably used. These atoms preferably are not greater than 1% by weight of chlorine, and more preferably not greater than 0.5% by weight of chlorine.

Examples of the optical cationic polymerization initiator include: sulfonium salt; iodonium salt; diazonium salt. Examples of the iodonium salt include: diphenyl iodonium hexafluorophosphate; diphenyl iodonium hexafluoroantimonate; diphenyl iodonium hexafluoroantimonate; diphenyl iodonium tetrafluoroborate; diphenyl iodonium tetrakis(pentafluorophenyl)borate; bis(dodecylphenyl)iodonium hexafluorophosphate; bis(dodecylphenyl)iodonium hexafluoroantimonate; bis(dodecylphenyl)iodonium hexafluoroborate; and bis(dodecylphenyl)iodonium tetrakis (pentafluorophenyl)borate.

(Manufacturing Method for Liquid Crystal Display Cell)

Figure 3A:
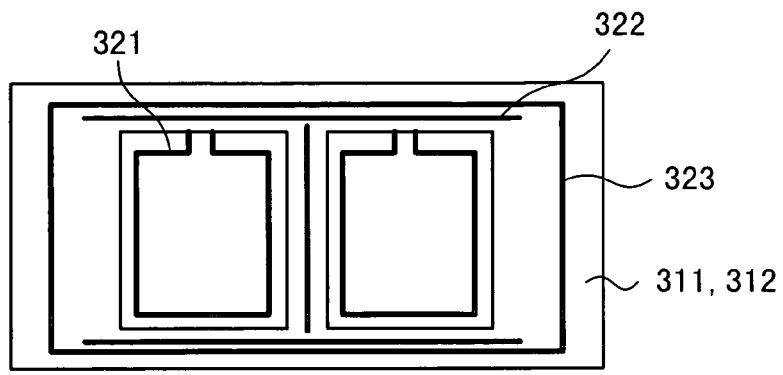
FIGS. 3A-3D are diagrams of a method for manufacturing a liquid crystal display cell according to an embodiment of the invention.

A method for manufacturing a liquid crystal display cell according to another embodiment of the invention will be explained. FIG. 3 is a diagram of the method for manufacturing a liquid crystal display cell. As shown in FIG. 3(a), to form a plurality of liquid crystal display cells, a plurality of liquid crystal cell areas are formed in two sheets of large glass substrates (first glass substrate 311, second glass substrate 312). The first glass substrate 311 has a display area and a peripheral pad area, both of which are provided in each liquid crystal display cell. The display area includes, for example, a plurality of pixel electrodes arranged in a matrix, and the peripheral pad area includes extension interconnects extended to peripheries of the display area and interconnection pads provided in the peripheries of the area. The display area includes thin film transistors (TFTs) serving as a switching device and driver terminals 330 (ITO, etc.) formed to allow display electrodes such as pixel electrodes, gate electrodes, source electrodes to connect to the terminals. Moreover, the second glass substrate 312 has an opposing electrode provided on an area opposing the display area.

(Bonding Step)

Then, in a bonding step, a sealant is coated on the first glass substrate 311 to bond the first glass substrate 311 to the second glass substrate 312 so that the two substrates are separated by a prescribed gap. For a sealant, a bonding agent such as epoxy resin is used. By using a dispensing or printing technique, the following are applied to the first glass substrate 311. A primary sealant 321 is used to form a liquid crystal sealing region. An auxiliary sealant 322 is used to prevent permeation of foreign substances into the liquid crystal display area. A double sealant 323 is used to surround the entire plurality of liquid crystal display cell areas.

Figure 3B:
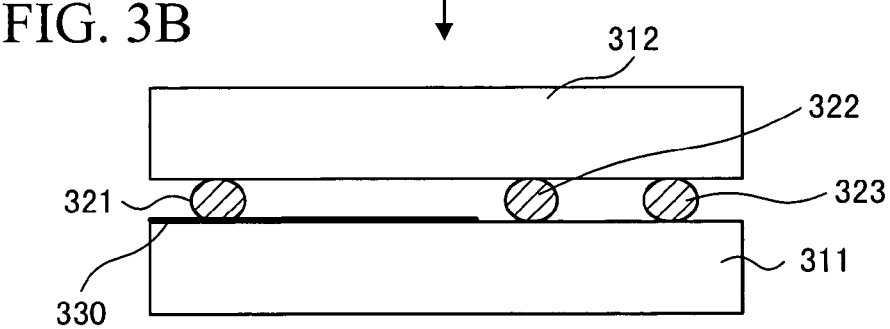

Subsequently, as shown in FIG. 3(b), the first glass substrate 311 and second glass substrate 312 are bonded together. In this case, both substrates are disposed facing each other so that the individual display areas of the first glass substrate 311 and the opposing electrodes of the second glass substrate 312 face each other. The substrates are bonded together by evenly applying pressure over the substrates. Then, the primary sealant 321, auxiliary sealant 322 and double sealant 323 are cured by being heated and irradiated with ultraviolet ray.

(Confining Step)

Subsequently, a liquid crystal is injected into the prescribed gap between the first glass substrate 311 and second glass substrate 312. Then, a liquid crystal injection port is sealed with, for example, ultraviolet curable resin to confine the liquid crystal within the liquid crystal sealing region formed between the first glass substrate 311 and second glass substrate 312.

(Thinning Step)

Figure 3C:
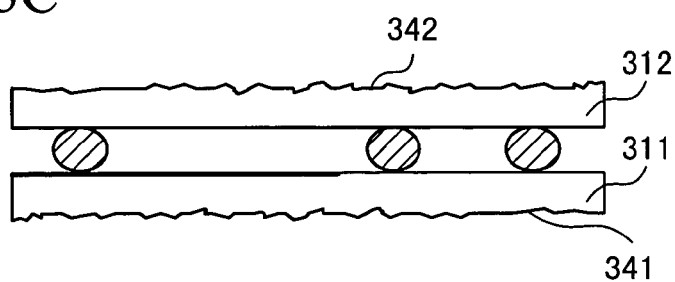

Subsequently, as shown in FIG. 3(c), the entire outer surfaces of the first glass substrate 311 and second glass substrate 312 are respectively thinned by a mechanical or chemical polishing process to achieve a predetermined thickness. For example, if the first glass substrate 311 or the second glass substrate 312 has a thickness of about 0.7 mm, those substrates are polished to a thickness of 0.3 to 0.4 mm. Furthermore, rough surfaces 341, 342 are formed on the surfaces, respectively.

(Sol-Gel Layer Formation Step)

Figure 3D:
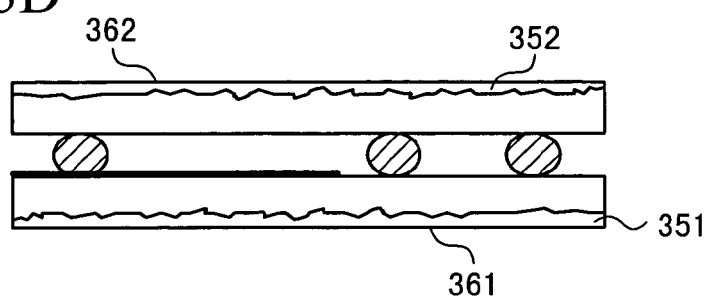

Then, as shown in FIG. 3(d), a solution of a metal alkoxide composition containing organic polysiloxane as a primary constituent is, for example, brush coated, spray coated, roller coated, or spin coated on the rough surfaces 341, 342 to an appropriate thickness (typically, not greater than 10 μm). The coated solution are then hydrolyzed at a temperature of not greater than 80 degrees C for a few minutes to a few hours to cure the coated solution to form sol-gel layers 351, 352. Mirror surfaces 361, 362 having a surface roughness (Ra) of not greater than 0.05 μm are formed on the sol-gel layers 351, 352.

Finally, the pair of the first glass substrate 311 and second glass substrate 312 on which the sol-gel layers 351, 352 containing organic polysiloxane is cut and divided into a plurality of liquid crystal display cell areas to produce liquid crystal display cells. Thus, the liquid crystal display cell with glass substrates with reduced thickness and weight is manufactured in accordance with the above-described manufacturing method.

According to the above-described manufacturing method, there is no need for a conventional finishing process performed to make a liquid crystal display cell lighter after surfaces of glass substrates are roughly polished. Furthermore, the sol-gel layers can be formed by a reaction at a relatively low temperature. Accordingly, after the first glass substrate and the second glass substrate are bonded together, the surfaces of the glass substrates can be thinned while enclosing the liquid crystal between the two substrates, which significantly simplifies the manufacturing steps. The surfaces of the glass substrates can also be thinned by injecting the liquid crystal between the two substrates, cutting the substrates into the individual liquid crystal display cells, polishing the surfaces of the substrates, and forming the sol-gel layers by coating with an appropriate solution.

Thus, according to the invention, a liquid crystal display cell can be provided that has glass substrates with increased surface roughness and restored light transmittance.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A liquid crystal display cell comprising:
   a pair of glass substrates separated by a prescribed gap;
   electrodes formed on inner surfaces of the substrates and opposing each other;
   a liquid crystal filled within the gap; and
   a metal oxide glass film covering an outer surface of at least one of the glass substrates and having a refractive index equivalent to a refractive index of the glass substrate;
   wherein the metal oxide glass film is formed by hydrolyzing a metal alkoxide composition comprising:
   organic polysiloxane having a methyl group or a phenyl group, as the primary constituent;
   organic siloxane having a hydroxyl group or a hydrolyzable functional group; and
   a curing agent.

2. The liquid crystal display cell according to claim 1, wherein the outer surface of the glass substrate is roughened by a physical or chemical technique.

3. The liquid crystal display cell according to claim 1, wherein the outer surface of the glass substrate is a rough surface having a surface roughness of not greater than 0.5 µm.

4. The liquid crystal display cell according to claim 1, wherein a difference between the refractive index of the glass substrate and the refractive index of the metal oxide glass film is within plus/minus 0.02.

5. A liquid crystal display cell comprising:
   a pair of glass substrates facing each other; and
   a liquid crystal enclosed between the pair of glass substrates,
   wherein each glass substrate comprises:
   a first layer having a rough surface with a surface roughness of not greater than 0.5 µm; and
   a second layer adhesively bonded to the first layer and having a mirror surface with a surface roughness of not greater than 0.05 µm; and
   wherein the second layer has a refractive index equivalent to a refractive index of the first layer and is formed by hydrolyzing a metal alkoxide composition coated on the first layer, the composition comprising:
   organic polysiloxane having a methyl group or a phenyl group, as the primary constituent;
   organic siloxane having a hydroxyl group or a hydrolyzable functional group; and
   a curing agent.

6. The liquid crystal display cell according to claim 5, wherein the second layer has a thickness of not greater than 10 µm.

7. The liquid crystal display cell according to claim 5, wherein the rough surface of the first layer is formed by roughening a surface of the glass substrate using a physical or chemical technique.

8. A display cell comprising:
   a glass substrate having a thickness reduced by a thinning process; and
   a sol-gel layer having a refractive index equivalent to a refractive index of the glass substrate and formed on a thin processed surface of the glass substrate;
   wherein the sol-gel layer is formed by hydrolyzing a metal alkoxide composition coated on the thinned glass substrate, the composition comprising:
   organic polysiloxane having a methyl group or a phenyl group, as the primary constituent;
   organic siloxane having a hydroxyl group or a hydrolyzable functional group; and
   a curing agent.

9. The display cell according to claim 8, wherein the hydrolyzing is performed at a temperature of not greater than 80 degrees C.

10. The display cell according to claim 8, wherein the curing agent comprises an organic tin compound or boron halide.

11. The display cell according to claim 8, wherein a refractive index of the glass substrate is from 1.48 to 1.52.

12. The display cell according to claim 8, wherein the thinning process comprises mechanical polishing or chemical polishing.

13. The display cell according to claim 8, wherein a thickness of the glass substrate is reduced by at least 20% by the thinning process.

14. The display cell according to claim 8, wherein a refractive index of the sol-gel layer is from 1.46 to 1.54.

15. A method for manufacturing a liquid crystal display cell, comprising:
   forming display electrodes on a first glass substrate and then bonding together the first glass substrate and a second glass substrate separated by a prescribed gap;
   confining a liquid crystal within the prescribed gap between the first glass substrate and the second glass substrate;
   reducing a thickness of the first glass substrate and/or the second glass substrate;
   forming a sot-gel layer having a refractive index equivalent to a refractive index of the first glass substrate and/or the second glass substrate and containing a hydrolyzed metal alkoxide composition as a primary constituent on outer surfaces of the first glass substrate and/or the second glass substrate, the composition comprising:
   organic polysiloxane having a methyl group or a phenyl group, as the primary constituent;
   organic siloxane having a hydroxyl group or a hydrolyzable functional group; and
   a curing agent.

16. The method for manufacturing a liquid crystal display cell according to claim 15, wherein reducing the thickness includes; mechanically processing the outer surfaces of the first glass substrate and/or the second glass substrate by using a polishing process, a blasting process or a grinding process, or chemically etching the outer surfaces while the liquid crystal is enclosed between the substrates.

17. The method for manufacturing a liquid crystal display cell according to claim 15, wherein a thickness of the first glass substrate and/or the second glass substrate is reduced by at least 20% while the liquid crystal is enclosed between the substrates.

18. The method for manufacturing a liquid crystal display cell according to claim 15, wherein the outer surfaces of the first glass substrate and/or the second glass substrate are transformed into rough surfaces having a surface roughness of not greater than 0.5 μm while the liquid crystal is enclosed between the substrates.

19. The method for manufacturing a liquid crystal display cell according to claim 15, wherein a sol with a solution of the metal alkoxide composition is coated on the outer surfaces of the reduced first glass substrate and/or the reduced second glass substrate, and the metal alkoxide composition is hydrolyzed to gel the sol.

* * * * *